United States Patent [19]

Eck

[11] Patent Number: 4,555,089

[45] Date of Patent: Nov. 26, 1985

[54] WHEEL LIFT DEVICE

[75] Inventor: Leonard F. Eck, McPherson, Kans.

[73] Assignee: Hein-Werner Corporation, Waukesha, Wis.

[21] Appl. No.: 588,390

[22] Filed: Mar. 12, 1984

[51] Int. Cl.[4] .................... B60P 1/48

[52] U.S. Cl. .................... 254/10 B

[58] Field of Search .................... 254/2 B, 8 B, 10 B, 254/124, 134; 414/426, 427

[56] References Cited

U.S. PATENT DOCUMENTS

| | | | |
|---|---|---|---|
| 2,217,898 | 10/1940 | Gemmill | 254/2 |
| 2,476,493 | 7/1949 | Johnson | 254/2 |
| 2,804,983 | 9/1957 | Wolf | 214/332 |
| 2,860,852 | 11/1958 | Lewis, Jr. | 254/10 B |
| 3,463,337 | 8/1969 | Reznicek | 214/332 |
| 3,850,321 | 11/1974 | Virnig | 214/331 |
| 4,401,405 | 8/1983 | Ealet | 414/428 |

*Primary Examiner*—Frederick R. Schmidt

*Assistant Examiner*—Judy J. Hartman

*Attorney, Agent, or Firm*—Litman, Day and McMahon

[57] ABSTRACT

A wheel lift device for raising and supporting a wheeled vehicle such as an automobile, by engagement with a vehicle wheel thereof includes a lower support frame, casters, a carriage for engagement with the vehicle wheel, support struts connecting the carriage to the support frame and maintaining the carriage substantially parallel to a floor, and a mechanism for raising and lowering the carriage with respect to the support frame. The support frame and carriage engage the wheel by approaching the wheel along its path of roll, i.e. from a front or rear end of the vehicle. During this engagement, portions of the wheel lift device extend parallel to and on opposite sides of the wheel to lift the wheel and vehicle from a position where the vehicle is standing on a floor. A vehicle supported by the subject wheel lift devices in engagement with each wheel is readily adjusted for wheel alignment.

5 Claims, 7 Drawing Figures

Fig. 1.
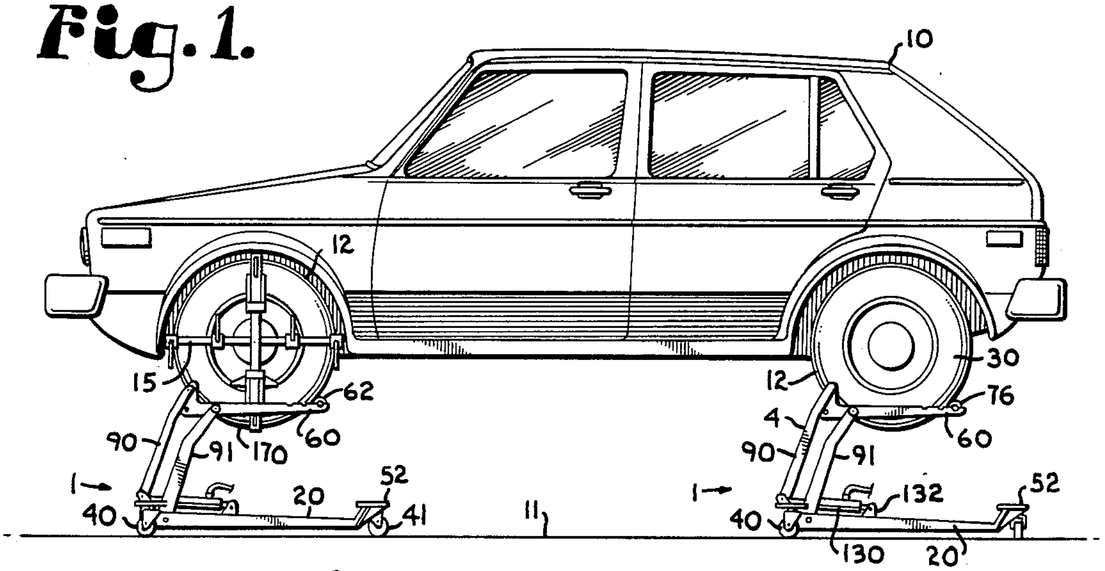
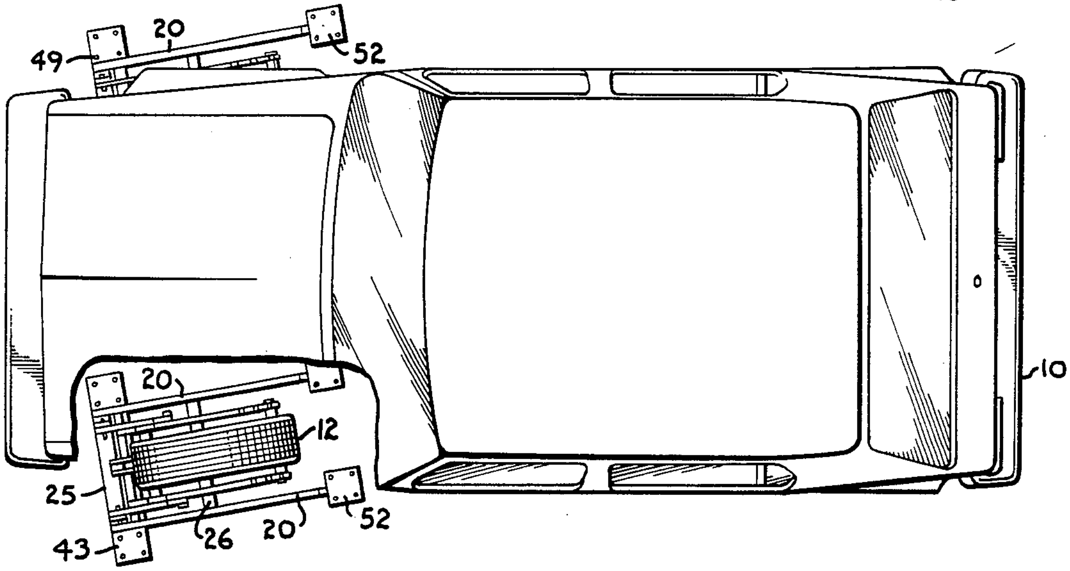
Fig. 2.
Fig. 3.
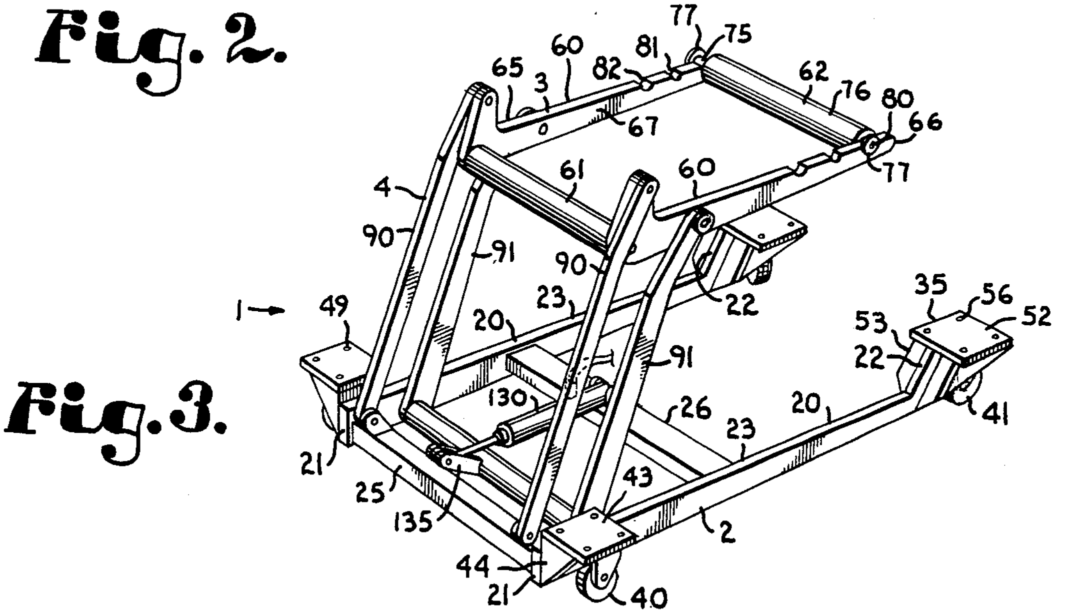

WHEEL LIFT DEVICE

This invention relates to an alignment apparatus for use in the adjustment of angular relationships of vehicle wheels such as tracking, caster, camber, toe-in, and steering axis cant and, in particular, relates to an apparatus providing vertical support of the vehicle during alignment.

Wheeled vehicles, such as automobiles, typically require periodic maintenance checks and adjustment of alignment. Normally, wheel alignment is correctly set at manufacture but after extensive vehicle use misalignment may occur and the vehicle may encounter handling difficulties, extensive tire wear, and may provide a poor ride. Such handling difficulties include vehicle wandering and pulling to one side, which require constant and annoying steering wheel correction by the driver, hard steering, and, in some instances, tendencies toward over-steering and understeering and improper tracking.

During alignment, adjustments are made in the wheel and axle assembly, the steering linkages, and related structures, which cause the wheel to be moved into the proper orientation. The wheel alignment process and the nature of the adjustments are described in U.S. Pat. Nos. 4,338,027 and 4,280,280 both of which are owned by applicant's assignee and are incorporated herein by reference.

During the alignment process, the vehicle wheel must be free to move into the orientation dictated by the adjustments. In the past, this has necessitated the use of alignment lifts exemplified by the rack and radius plate structure described in U.S. Pat. No. 4,280,280, which were so large that they required the dedication of a vehicle bay in an automotive work shop to the alignment machinery. This can be expensive, inefficient and inconvenient.

Another problem with the prior lifts is that they did not permit the alignment adjustments to be made while the vehicle was supported by its wheels. Rather, the vehicle would stand on the lift during the alignment measurements and then would be raised by points under the frame, allowing the wheels to hang unsupported, during the adjustments. It has been found that, in modern vehicles, lightweight automobile frames tend to bend or sag if the vehicle is not supported by its wheels. As a result of this bending, wheel alignment may be further distorted, and true alignment never achieved, if the prior art wheel alignment methods and apparatus are used with modern, lightweight vehicles.

OBJECTS OF THE INVENTION

The principal objects of the present invention are: to provide a wheel lift device for raising a vehicle by engagement with vehicle wheels, thereby permitting wheel alignment adjustments to be made on the vehicle; to provide such a device which is compatible for use with line-of-sight wheel alignment apparatus such as that described in U.S. Pat. No. 4,338,027; to provide such a device with which wheel alignment adjustments may be made while the vehicle is supported solely by its wheels, in order to prevent frame bending; to provide such a device which may be used on almost any garage floor; to provide such a device which does not require the dedication of a special area of a garage floor to its use; to provide such a device which is readily portable; to provide such a device which is easily deployed and dismantled; to provide such a device which does not interfere with the adjustments necessary for wheel alignment; to provide such a device which is relatively inexpensive to manufacture and maintain; and to provide such a device which is relatively sturdy and efficient in use and for which a method of use thereof is simply and easily applied.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a side elevational view of several wheel alignment apparatu,s embodying the present invention and shown in connection with an automotive vehicle.

FIG. 2 is a top plan view of an automotive vehicle supported by the wheel alignment apparatus, with portions broken away to show detail.

FIG. 3 is a side perspective view of the wheel alignment apparatus.

DETAILED DESCRIPTION OF THE INVENTION

Figure 5:
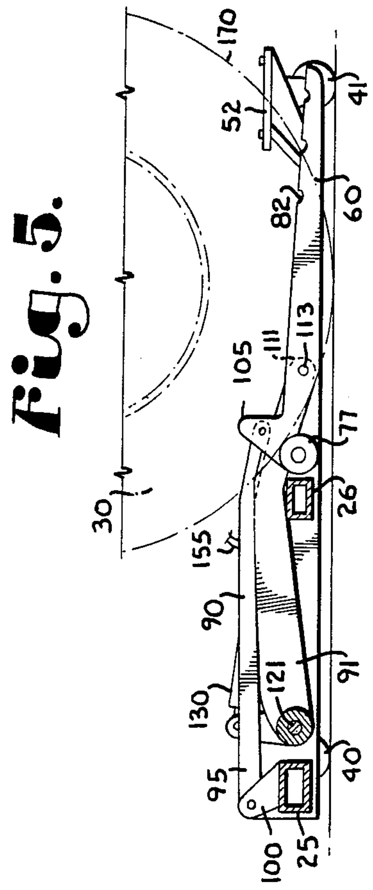
FIG. 5 is a longitudinal cross section of the wheel lift device taken along line 5—5 of FIG. 4.
Figure 7:
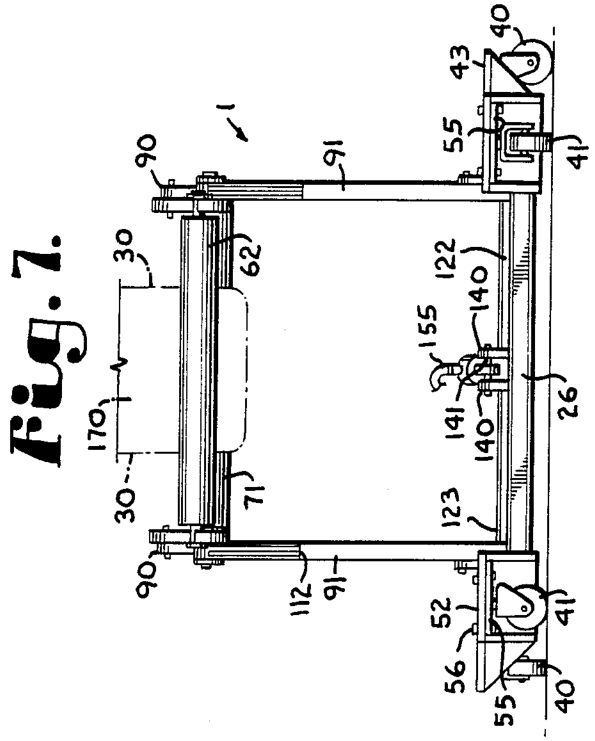
FIG. 7 is a rear elevational view of the wheel lift device shown supporting a wheel of a wheeled vehicle.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a wheel lift device embodying the present invention. The device 1 includes a lower support frame 2, an upper carriage 3 and support links 4.

In the illustrated example, FIGS. 1 and 2, a vehicle 10 such as a truck or car of which the wheel alignment is to be checked, is supported above a garage floor 11 by the wheel lift devices 1. The support is provided by engagement of the wheel lift devices 1 with wheels 12 of the vehicle 10. While the vehicle 10 is so supported, a target structure 15 may be attached to the wheels 12 and wheel alignment determined with a line-of-sight wheel alignment apparatus, not shown, as described in applicant's U.S. Pat. No. 4,338,027.

Figure 4:
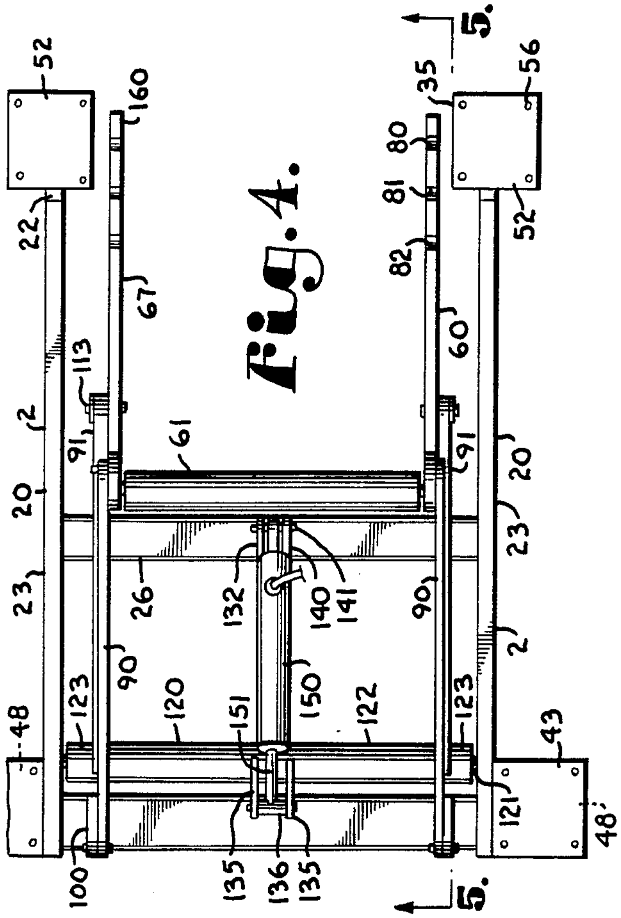
FIG. 4 is an enlarged plan view of the wheel alignment apparatus with a portion removed, thus preparing the wheel alignment apparatus for engagement with a vehicle wheel.
Figure 6:
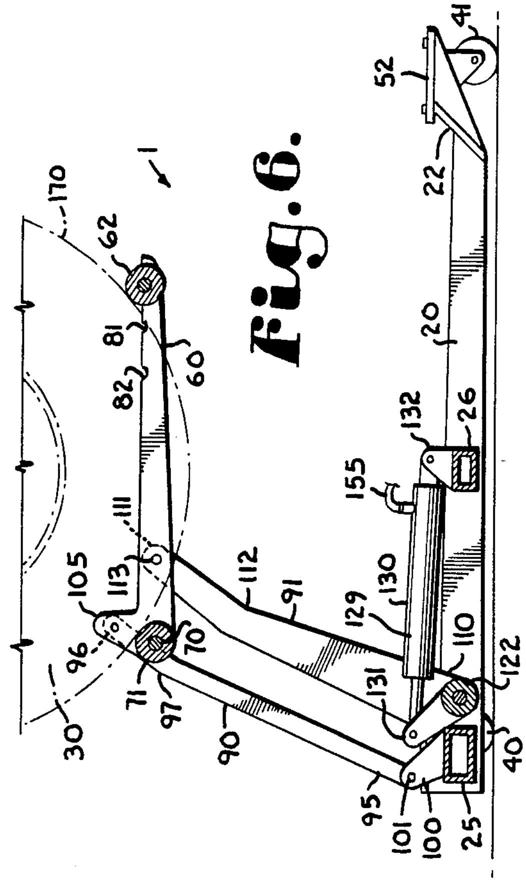
FIG. 6 is a side elevational view of the wheel lift device.

As will become clear from structure described below, the wheel lift device 1 is a form of vehicle lift or jack which has two extreme positions, raised and lowered. In FIGS. 1, 2, 3, 6 and 7, the wheel lift device 1 is pictured in a raised orientation. In FIGS. 4 and 5, however, the device 1 is shown with the carriage 3 lowered.

The lower support frame 2 includes support members 20 each having a front end 21, a tail end 22, and a central portion 23. The support members 20, as are all of the major structural components of the wheel lift device 1, are formed from a metal such as steel which may support the weight of the vehicle 10 without significant fatigue.

Front and central cross members, 25 and 26 respectively, form the other major structural components of the lower support member 2. The front cross member 25 is mounted on the front ends 21 of the support members 20. The central cross member 26 is mounted on the central portions 23 of the support members 20 and strengthens the structure. The support members 20 are spaced sufficiently apart to permit the wheel 12 to be positioned between them with the support members 20 extending parallel to the wheel sides or sidewalls 30, that is the portions of the wheels that do not engage a road or garage floor, FIG. 7. In the embodiment shown, the connections between the support members and the cross members are secured by welding, however a variety of types of fastening means may be used.

The lower support frame 2, FIG. 3, includes an open end 35 between the tail ends 22 of the support members 20. As described below, the open end 35 permits the lower support frame 2 to be positioned relative to the wheel 12 for use of the wheel lift device 1.

Front casters 40 and rear casters 41 provide support and movement of the wheel lift device 1 over the garage floor 11. The front casters 40 are mounted on arms 43 which extend above and outwardly from the support members 20. The arms 43 are mounted upon the front ends 21 of the support members 20 by brackets 44. The positioning of the front casters 40 on the outwardly extending arms 43 increases the stability of the wheel lift device 1.

Each front caster 40 is pivotally mounted to a caster plate, not shown. The caster plates are affixed to the front arms 43 by bolts 49.

Each rear caster 41 is mounted upon a tail platform 52 which is centered upon, and attached to, the tail end 22 of the support member 20 by bracket 53.

The rear casters 41 are pivotally mounted upon caster plates 55 which are affixed to the tail platforms 52 by bolts 56. The upward angling of the tail ends 22 of the support members 20, when combined with the centering of the tail platforms 52 upon the tail ends 22, permits each rear caster 41 to be mounted in line with its associated support member rather than extending to the side as with the front casters 40. Stability of the wheel lift device 1 and ease of movement over the garage floor 11 is facilitated by this arrangement.

The upper carriage 3 includes side legs 60, a front arm member 61, and a rear arm member 62 forming a generally rectangular shape, FIG. 3. Each of the side legs 60 includes a front portion 65, a rear portion 66, and a central portion 67. The side legs 60, FIGS. 3 and 4, are substantially parallel to one another and to the support members 20.

The front arm member 61 includes an axle 70 and a roller 71. The axle 70 extends between the front portions 65 of the side legs 60 and is mounted thereto in a manner permitting the roller 71 to freely rotate. The length of the front arm member 61 is such that the distance between the two parallel side legs 60 is less than the distance between the tail platforms 52, so that the upper carriage 3 may be recessed between the support members 20, FIG. 4.

The rear arm member 62 includes an axle 75, a roller 76 and two end flanges 77. During assembly, the rear arm member 62 rests in the upper carriage 3 between the rear portions 66 of the legs 60. Indentations 80 in the side legs 60 retain the rear arm member 62 in position. End flanges 77 on the end of the axle 75 aid in preventing the rear arm member 62 from accidentally becoming disengaged from the carriage 3.

The indentations 80 are located in the rear portion 66 of the side legs 60 such that when the rear arm member 62 is mounted within the carriage 3, the rear arm member 62 is parallel to the front arm member 61. Additional pairs of indentations 81 and 82 may be provided in the wheel lift device 1 so that the distance between the front arm member 61 and rear arm member 62 is adjustable.

As with the front roller 71, the rear roller 76 freely rotates about its axle.

The carriage 3 is movably mounted within the wheel lift device 1 by a lifting mechanism including the support links 4, FIG. 3. The support links 4 include front links or struts 90 and rear links or struts 91. Each of the front links 90 includes a lower end 95, an upper end 96, and a bend 97. Each front link lower end 95 is pivotally mounted on a bracket 100, as by bolts 101. Each bracket 100 is mounted upon the front cross member 25 of the lower support frame 2.

The upper end 96 of each front link 90 is pivotally attached to a vertical extension 105 on the front portion 65 of each carriage side leg 60. The bend 97 in each front link 90 permits the carriage 3 to be recessed below the central cross member 26, FIG. 5.

Each rear link 91 includes a lower end 110, an upper end 111 and a bend 112. The upper end 111 of each link 91 is pivotally connected to the central portion 67 of a side leg 60 by a bolt 113. The lower end 110 of each rear link 91 is mounted on a roller 120 extending between the support members 20.

The roller 120 includes an axle 121, a roller surface 122 and roller ends 123. The roller 120 is mounted within the wheel lift device 1 with the axle 121 extending between the support members 20. The lower end 110 of each rear link 91 is mounted near a roller end 123. As a consequence, rotation of the roller 120 about the axle 121 causes the rear links 91 to arc between substantially horizontal positions, FIG. 5, and substantially vertical positions, FIG. 3. The rear links 91 are attached to the roller ends 123 so that the rear links 91 are substantially parallel to one another. Bends 112 in rear links 91 permit recession of the carriage 3 below the central cross member 26, in FIG. 5.

The front and rear links 90 and 91 are mounted substantially parallel one another, thus forming a portion of a parallogram lifting mechanism. The parallelogram lifting mechanism supports the carriage 3 in an orientation substantially horizontal and parallel the lower support frame 2, regardless of whether the upper carriage 3 is raised as in FIG. 3, lowered as in FIG. 5, or located in between these two extreme positions.

Selective rotation of the roller 120 to raise the carriage 3 is provided by a longitudinal force means 129. In the preferred embodiment, the longitudinal force means 129 comprises a single action or gravity returned pneudraulic ram 130 and brackets 131 and 132. Bracket 131 is mounted upon the roller surface 122 and includes spaced arms, forming a clevis 135, and a pivot pin 136. The clevis 135 extends outwardly from the roller surface 122 to form approximately a 90 degree angle with the rear links 91, such that when the rear links 91 extend horizontally and rearwardly from the roller 120, the clevis 135 therefor substantially vertically, FIG. 5.

The rear bracket 132 is mounted upon the central cross member 26 and includes arms 140 and a pivot pin 141. The arms 140 extend substantially vertically from the central cross member 26.

The pneudraulic ram 130 comprises a cylinder 150 and a piston 151. The term "pneudraulic ram" refers to a cylinder and piston arrangement which is either pneumatically or hydraulically operated and, in the illustrated example, is pneumatic. The pneudraulic ram 130 extends between the central cross member 26 and the roller 120, which are positioned a distance apart such that when the clevis 135 is substantially vertical, the piston 151 is substantially retracted within the cylinder 150.

The extension of the pneudraulic ram 130 causes the clevis 135 of the bracket 131 to move from a substantially vertical position, FIG. 5, to a substantially horizontal position, FIG. 3. This extension rotates the roller 120 and moves the links 90 and 91 from substantially horizontal positions to substantially vertical positions to raise the carriage 3 from the lower position, FIG. 5, to the upper position, FIG. 3. In the embodiment shown, operation of the pneudraulic ram 130 is pneumatic and requires a source, not shown, of pressurized air and an air hose 155.

The lifting mechanism described offers a distinct mechanical advantage to lifting mechanisms used in other types of wheel jacks. During the early part of the lifting, the rate of vertical lift of the carriage 3 per degree of rotation of the roller 120 is greater than it is when the carriage 3 approaches its highest point. Because of this, fine adjustment of the height of the carriage 3 is easier when the carriage 3 is nearly fully raised, as it will be when the wheel lift device 1 is in use. Also, the greater lifting occurs when the ram 130 is just beginning to extend and actuation is easiest.

For use, the wheel lift device 1 is prepared for engagement with a wheel 12 by gravity or similarly retracting the piston 151 within the cylinder 150, FIG. 5. The rear arm member 62 is removed from the carriage 3 leaving a gate or opening 160. The wheel lift device 1 is rolled over the garage floor 11 into proper orientation for engagement with the wheel 12. For this engagement, the wheel lift device 1 is rolled toward the outside tread, or rolling surface 170, of the wheel 12 to be lifted. The wheel 12 is received within the opening 160 of the carriage 3 until the support members 20 and the legs 60 extend substantially parallel the wheel sides 30, with the wheel 12 standing between the side legs 60 and also between the support members 20. The rear arm member 62 is then replaced between the two legs 60.

Lifting the wheel 12 is caused by extending the pneudraulic ram 130. The front and rear arm members 61 and 62 contact the wheel rolling surface 170 and raise the vehicle 10 above the garage floor 11.

During wheel alignment, the vehicle 10 is lifted by four wheel lift devices 1, FIG. 1. The vehicle 10 is then solely supported by its wheels during the entire alignment process. The lift device casters 40 and 41 permit the front wheels of the vehicle 10 to be turned about the vehicle steering axis, FIG. 2. Also, the wheel lift devices permit small movements of the wheels, necessary to accommodate the alignment adjustments, without taking the weight of the vehicle off of the vehicle wheels; thus, frame bending or sagging is minimized. Further, the rollers 71 and 76 allow each wheel 12 to be rotated about its axis for checking runout.

The wheel lift device 1 does not interfere with mounting of a wheel alignment target structure 15 onto the wheel 12, FIG. 1. Thus, the wheel lift devices are particularly adapted for use during wheel alignment adjustments performed with applicant's line-of-sight wheel alignment apparatus, U.S. Pat. No. 4,338,027.

It is to be understood that while certain forms of the present invention have been illustrated and described herein, it is not to be limited to the specific forms or arrangement of parts described and shown.

What is claimed and desired to be secured by Letters Patent is as follows:

1. A wheel lift device for raising and lowering a vehicle by engagement with a vehicle wheel, said vehicle wheel having an outer rolling surface and opposite generally parallel sidewalls; said device comprising:

(a) a lower support frame having an open end and two substantially parallel support members;
 (i) said support members laterally spaced and having a cross-member extending therebetween;
 (ii) said lower support frame being movable and adapted to approach said wheel and receive a portion of said wheel therein with said support members extending on opposite sides of said wheel and generally parallel to the sidewalls of said wheel and with a portion of said rolling surface received within said open end;
(b) casters mounted on said lower support frame for movement of said wheel lift device over a floor surface;
(c) an upper generally rectangular carriage movable generally above said support frame;
(d) a lifting mechanism including support means extending between said support frame and said carriage;
 (i) said support means including a first pair of links and a second pair of links;
 (ii) said first and second pair of links pivotally connected to and extending between said support frame and said carriage;
 (iii) said first and second pair of links forming a substantially parallelogram structure and maintaining said carriage substantially parallel to said support frame during said raising and lowering;
(e) longitudinal force means for selectively actuating raising and lowering of said carriage relative to said support frame;
(f) said rectangular carriage having two substantially parallel legs forming two sides thereof and laterally spaced for extending on opposite sides of said wheel and generally parallel to said sidewalls of said wheel when said wheel lift device is in use; said carriage having arm members extending between said legs, said arm members forming two opposing generally parallel sides of said rectangular carriage;
 (i) said carriage engageable with said wheel outer rolling surface to cradle said wheel between said arm members and lift said vehicle;
 (ii) said arm members including elongate rollers upon which said wheel rolling surface is supported during lifting of said vehicle;
 (iii) said arm members being first and second arm members;
(g) gate means including said second arm member;

(i) said gate means permitting said carriage to approach said wheel while said vehicle is standing on said floor with a portion of said rolling surface entering said carriage and with said carriage legs straddling said wheel and extending on opposite sides thereof and generally parallel to said wheel sidewalls;

(ii) said gate means being closable to reform said generally rectangular carriage.

2. A wheel lift device for raising and lowering a vehicle by engagement with a vehicle wheel, said vehicle wheel having an outer rolling surface and opposite sides, said device comprising:

(a) a lower support frame;

(b) casters mounted on said lower support frame for movement of said wheel lift device over a floor surface;

(c) an upper carriage movable generally above said support frame;

(d) a lifting mechanism including support means extending between said support frame and said carriage;

(i) said support means comprising first and second links pivotally connected to and extending between said support frame and said carriage;

(ii) said lifting mechanism forming a parallelogram structure;

(e) longitudinal force means mounted on said lower support frame and engaging said support means for selective raising and lowering of said carriage relative to said support frame;

(i) said force means including a pneudraulic ram selectively extendable and retractable for causing said raising and lowering;

(ii) said parallelogram structure maintaining said carriage parallel to said floor during said raising and lowering;

(f) said carriage having two parallel legs laterally spaced for extending parallel said wheel sides with said wheel standing between said legs when said wheel lift device is in use; said carriage having first and second arm members extending between said legs;

(i) said carriage engageable with said wheel outer rolling surface to cradle said wheel between said arm members and to lift said vehicle;

(ii) said arm members including elongate rollers supporting said wheel rolling surface during lifting of said vehicle;

(g) two indentations in said carriage parallel legs;

(h) an axle on said second arm member;

(i) said axle extending between said indentations and being supported within said carriage thereby; whereby said second arm member is removable and replaceable within said carriage;

(ii) said carriage, with said second arm member removed, having an open end therein; said carriage open end permitting said carriage to approach said wheel with a portion of said rolling surface entering said carriage open end and with said legs extending on opposite sides of said wheel and substantially parallel thereto; thereby permitting engagement of said carriage with said wheel while said vehicle stands on said floor.

3. A wheel lift device for raising and lowering a vehicle by engagement with a vehicle wheel, said vehicle wheel having an outer rolling surface and opposite sides, said device comprising:

(a) a lower support frame having an open end, two substantially parallel support members, and first and second cross-members;

(i) said support members laterally spaced and having said cross-members extending therebetween; said cross-members being substantially parallel to one another and substantially perpendicular to said support members;

(ii) said lower support frame movable and adapted to approach said wheel and receive a portion of said wheel therein with said support members extending on opposite sides of said wheel and substantially parallel thereto;

(b) casters mounted on said lower support frame for movement of said wheel lift device over a floor surface;

(c) an upper carriage movable generally above said support frame;

(d) a lifting mechanism including support means extending between said support frame and said carriage;

(i) said support means including a first pair of links and a second pair of links;

(ii) said first pair of links comprising first and second struts pivotally mounted on said lower support frame and pivotally connected to an end of said carriage;

(iii) said second pair of links comprising third and fourth struts rigidly mounted to an actuator roller extending between said frame support members; said actuator roller being substantially parallel said cross-members and perpendicular said support members; said third and fourth struts being mounted substantially parallel to one another and pivotally connected to said carriage and supporting said carriage substantially therebetween;

(iv) said actuator roller having lever arms mounted thereon; movement of said lever arms causing rotation of said actuator roller and an arc movement of said third and fourth struts between substantially horizontal and substantially vertical positions thereby raising and lowering said carriage;

(v) said lever arms being substantially vertical when said third and fourth struts are substantially horizontal and said lever arms being substantially horizontal when said third and fourth struts are substantially vertical;

(vi) said lever arms providing selective raising and lowering of said carriage with said struts supporting said carriage in an orientation substantially parallel to said floor throughout said lifting;

(e) longitudinal force means mounted on said lower support frame and engaging said lifting mechanism for raising and lowering said carriage relative to said support frame;

(i) said longitudinal force means including a pneudraulic ram mounted on one of said support frame cross-members and in engagement with said lever arms; said ram having extended and retracted positions;

(ii) said lever arms being substantially vertical, said struts substantially horizontal, and said carriage in a lowest position when said ram is retracted;

(iii) said lever arms being substantially horizontal, said struts substantially vertical and said carriage in a highest position when said ram is fully extended;

(f) said carriage having two parallel legs laterally spaced for extending parallel to said sides of said wheel with said wheel standing between said legs when said wheel lift device is in use; said carriage having first and second arm members extending between said legs;

(i) said carriage being engageable with said wheel outer rolling surface to cradle said wheel between said arm members;

(ii) said arm members including elongate rollers supporting said wheel rolling surface during lifting of said vehicle and permitting said wheel to rotate;

(g) a first pair of indentations in said carriage parallel legs;

(h) an axle on said second arm member;

(i) said axle extending between said indentations and being retained within said carriage thereby; said second arm member being removable from said carriage and replaceable therein;

(ii) said carriage, with said second arm member removed, having an open end therein; said open end permitting said carriage to approach said wheel with a portion of said rolling surface entering said carriage open end and with said legs extending on opposite sides of said wheel and substantially parallel thereto; thereby permitting engagement of said carriage with said wheel of said vehicle when said vehicle stands on said floor.

4. The wheel lift device according to claim 3 including:

(a) a plurality of pairs of indentations in said carriage parallel legs;

(i) said second arm member being mountable in any of said pairs of indentations; whereby the distance between the first arm member and the second arm member may be varied to accommodate vehicle wheels of various diameters.

5. A wheel lift device for raising and lowering a vehicle by engagement with a vehicle wheel, said vehicle wheel having an outer rolling surface and opposite sides; said device comprising:

(a) a lower support frame having an open end and two substantially parallel support members;

(i) said support members being laterally spaced and having a cross-member extending therebetween;

(ii) said lower support frame being movable and adapted to approach said wheel and receive a portion of said wheel therein with said support members extending on opposite sides of said wheel and with a portion of said rolling surface received within said open end;

(b) casters mounted on said lower support frame for movement of said wheel lift device over a floor surface;

(c) an upper carriage movable generally above said support frame;

(d) a lifting mechanism including support means extending between said support frame and said carriage;

(i) said support means including a first pair of links and a second pair of links;

(ii) said links pivotally connected to and extending between said support frame and said carriage;

(iii) said links forming a substantially parallelogram structure and maintaining said carriage substantially parallel to said support frame during said raising and lowering;

(e) longitudinal force means for selectively actuating raising and lowering of said carriage relative to said support frame;

(f) said carriage having two substantially parallel legs laterally spaced for extending on opposite sides of said wheel when said wheel lift device is in use; said carriage having arm members extending between said legs;

(i) said carriage being engageable with said wheel outer rolling surface to cradle said wheel between said arm members and lift said vehicle;

(ii) said arm members including elongate rollers upon which said wheel rolling surface is supported during lifting of said vehicle;

(iii) said arm members being first and second arm members;

(iv) said carriage legs including two indentations therein;

(v) said second arm member including means engaging said indentations whereby said second arm member is supported within said carraige and said second arm member may be removed from said carriage and replaced therein; and (g) gate means including said second arm member;

(i) said gate means permitting said carriage to approach said wheel while said vehicle is standing on said floor with a portion of said rolling surface entering said carriage and with said carriage legs straddling said wheel and extending on opposite sides thereof.

* * * * *